US008292732B2

(12) United States Patent
Breslo

(10) Patent No.: US 8,292,732 B2
(45) Date of Patent: Oct. 23, 2012

(54) GAMING MACHINE HAVING A VISUAL INDICATOR THAT INDICATES THE DEGREE IN WHICH THE GAMING MACHINE IS CURRENTLY PLAYING HOT AS DETERMINED FROM THE PAYOUT VALUES OF PREVIOUS GAME PLAY RESULTS

(75) Inventor: James A. Breslo, Pacific Palisades, CA (US)

(73) Assignee: Diamond Game Enterprises, Inc., Chatsworth, CA (US)

( * ) Notice: Subject to any disclaimer, the term of this patent is extended or adjusted under 35 U.S.C. 154(b) by 571 days.

(21) Appl. No.: 12/434,130

(22) Filed: May 1, 2009

(65) Prior Publication Data

US 2010/0075733 A1 Mar. 25, 2010

Related U.S. Application Data

(60) Provisional application No. 61/098,520, filed on Sep. 19, 2008.

(51) Int. Cl.
*A63F 9/24* (2006.01)
*A63F 13/00* (2006.01)

(52) U.S. Cl. ........................................................ 463/27

(58) Field of Classification Search .................... 463/17, 463/27

See application file for complete search history.

(56) References Cited

U.S. PATENT DOCUMENTS

| | | | | |
|---|---|---|---|---|
| 5,348,299 | A | 9/1994 | Clapper, Jr. | |
| 5,941,771 | A | 8/1999 | Haste, III | |
| 7,824,259 | B2 * | 11/2010 | Walker et al. | 463/17 |
| 2006/0211471 | A1 * | 9/2006 | Walker et al. | 463/16 |
| 2008/0045288 | A1 * | 2/2008 | Moshal et al. | 463/16 |

* cited by examiner

*Primary Examiner* — William D Coleman

(74) *Attorney, Agent, or Firm* — Panitch Schwarze Belisario & Nadel LLP

(57) ABSTRACT

A gaming machine provides for random winning payouts for game plays. The gaming machine includes a game score module and a visual indicator. The game score module tracks previous game play results including all winning and losing game play results, and determines from the previous game play results the degree in which the gaming machine is currently playing hot. The visual indicator is on the gaming machine or physically mounted to the gaming machine and indicates the degree in which the gaming machine is currently playing hot. The visual indicator may be a thermometer-type gauge.

37 Claims, 6 Drawing Sheets

Percent of Time Thermometer Is at Value

| | Min Score | 93 12L | 93 1L |
|---|---|---|---|
| HOT | 1.4 | 11.63% | 15.66% |
| WARM | 1 | 23.87% | 16.88% |
| MEDIUM | 0.7 | 30.51% | 21.61% |
| COOL | 0.4 | 28.88% | 25.60% |
| FRIGID | 0 | 5.11% | 20.05% |

Devil Sevens Thermometer: 93%

Percent of Time Thermometer is at Value

| | Min Score | 93 12L | 93 1L |
|---|---|---|---|
| HOT | 1.4 | 11.63% | 15.66% |
| WARM | 1 | 23.87% | 16.88% |
| MEDIUM | 0.7 | 30.51% | 21.61% |
| COOL | 0.4 | 28.88% | 25.60% |
| FRIGID | 0 | 5.11% | 20.05% |

| 93 i2L Curve | | 93 iL Curve | |
|---|---|---|---|
| 0 | 0 | 0 | 0.017531 |
| 0.1 | 0.0001 | 0.1 | 0.044254 |
| 0.2 | 0.007663 | 0.2 | 0.063351 |
| 0.3 | 0.043384 | 0.3 | 0.075371 |
| 0.4 | 0.079516 | 0.4 | 0.084274 |
| 0.5 | 0.100175 | 0.5 | 0.087822 |
| 0.6 | 0.109098 | 0.6 | 0.085901 |
| 0.7 | 0.109812 | 0.7 | 0.080448 |
| 0.8 | 0.103134 | 0.8 | 0.072417 |
| 0.9 | 0.09211 | 0.9 | 0.063276 |
| 1 | 0.078739 | 1 | 0.053946 |
| 1.1 | 0.065404 | 1.1 | 0.045464 |
| 1.2 | 0.05293 | 1.2 | 0.038022 |
| 1.3 | 0.041598 | 1.3 | 0.031368 |
| 1.4 | 0.031956 | 1.4 | 0.025549 |
| 1.5 | 0.023972 | 1.5 | 0.020916 |
| 1.6 | 0.017808 | 1.6 | 0.016853 |
| 1.7 | 0.012802 | 1.7 | 0.013978 |
| 1.8 | 0.009226 | 1.8 | 0.011494 |
| 1.9 | 0.006491 | 1.9 | 0.006564 |
| 2 | 0.004506 | 2 | 0.008209 |
| 2.1 | 0.003123 | 2.1 | 0.00708 |
| 2.2 | 0.002161 | 2.2 | 0.006227 |
| 2.3 | 0.001457 | 2.3 | 0.005334 |
| 2.4 | 0.000981 | 2.4 | 0.004699 |
| 2.5 | 0.000654 | 2.5 | 0.004035 |
| 2.6 | 0.000431 | 2.6 | 0.003536 |
| 2.7 | 0.000281 | 2.7 | 0.003027 |
| 2.8 | 0.00018 | 2.8 | 0.002525 |
| 2.9 | 0.000107 | 2.9 | 0.002092 |
| 3 | 7.11E-05 | 3 | 0.001757 |
| 3.1 | 4.61E-05 | 3.1 | 0.001477 |
| 3.2 | 2.7E-05 | 3.2 | 0.001271 |
| 3.3 | 1.9E-05 | 3.3 | 0.001163 |
| 3.4 | 1.3E-05 | 3.4 | 0.001107 |
| 3.5 | 1.1E-05 | 3.5 | 0.000978 |
| 3.6 | 5.01E-06 | 3.6 | 0.000882 |
| 3.7 | 4.01E-06 | 3.7 | 0.000819 |
| 3.8 | 1E-06 | 3.8 | 0.000731 |
| 3.9 | 1E-06 | 3.9 | 0.000661 |
| 4 | 2E-06 | 4 | 0.000579 |

*Figure 3*

GAMING MACHINE HAVING A VISUAL INDICATOR THAT INDICATES THE DEGREE IN WHICH THE GAMING MACHINE IS CURRENTLY PLAYING HOT AS DETERMINED FROM THE PAYOUT VALUES OF PREVIOUS GAME PLAY RESULTS

CROSS-REFERENCE TO RELATED APPLICATIONS

This application claims the benefit of U.S. Provisional Application No. 61/098,520 filed Sep. 19, 2008.

BACKGROUND OF THE INVENTION

Gaming machines, such as slot machines placed in wagering/betting environments are often characterized as being "hot" or "cold." U.S. Published Patent Application No. 2008/0026822 (Walker et al.) describes various metrics that may be used for determining whether a gaming machine is hot or cold, such as coins paid per unit time, the number of winning outcomes per unit time, the number of consecutive outcomes of a particular type (wins, losses), and the percentage of all wagers paid out as winnings (e.g., per unit time).

Standard slot machines do not technically get hot or cold because the odds of hitting a winning combination are determined by a random number generator (RNG) contained in the machine's software and is exactly the same with every spin. Stated another way, a standard slot machine is not more likely to hit a winning combination if it hasn't paid out a jackpot in a long time, nor is it less likely to hit a winning combination shortly after hitting one.

BRIEF SUMMARY OF THE INVENTION

In one preferred embodiment, a gaming machine provides for random winning payouts for game plays. The gaming machine includes a game score module and a visual indicator. The game score module tracks previous game play results including all winning and losing game play results, and determines from the previous game play results the degree in which the gaming machine is currently playing hot. The visual indicator is on the gaming machine or physically mounted to the gaming machine and indicates the degree in which the gaming machine is currently playing hot. The visual indicator may be a thermometer-type gauge.

Each game play has a payout value, such as the value of game credits won divided by game credits wagered. The payout value may range from zero to a predetermined maximum value. The game score module determines the degree in which the gaming machine is currently playing hot by comparing an average of the payout value of a predetermined number of previous game plays (e.g., 100 game plays) to a plurality of ranges of benchmark values. The highest range of benchmark values indicates a hot gaming machine. If the visual indicator is a thermometer-type gauge, a hot gaming machine shows a full thermometer.

In one preferred embodiment, the predetermined previous game plays are consecutive game plays immediately preceding the current game play, and the game score module further comprising a circular buffer for storing the predetermined number of previous game plays.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown.

In the drawings:

FIG. 3 shows the data points associated with the probability curves of FIG. 2.

DETAILED DESCRIPTION OF THE INVENTION

Certain terminology is used herein for convenience only and is not to be taken as a limitation on the present invention.

The present invention describes gaming machine devices that instantly communicate to the player whether the gaming machine devices are hot or cold, even though such a gauge may have no statistically significant relevance to the likelihood of the next play being a winner. Providing such a gauge directly on a gaming machine or proximate to a bank of gaming machines may entice additional game play compared to having no gauge at all on the gaming machine.

By providing a degree of hotness directly on a gaming machine, some players may be enticed to play a hot gaming machine believing that it will continue to be hot, other players may be enticed to play a cold gaming machine believing that it is overdue for a win, while still other players may be enticed to play a gaming machine that is neither hot nor cold, believing that a hot machine will not continue to be hot and a cold machine will continue to be cold. Such a gauge thus appeals to a wide variety of players for different psychological reasons.

In one preferred embodiment of the present invention, the gaming machine is a pull-tab machine, such as a machine commercially available from Diamond Game Enterprises, Inc., Chatsworth, Calif., and more specifically, a Lucky Tab II pull-tab dispenser. Such a dispenser releases one pull-tab ticket at a time off a roll contained inside the cabinet. A barcode scanner reads the back of the ticket as it is dispensed and displays the contents of the ticket on a video monitor. Examples of pull tab machines are shown in U.S. Pat. No. 5,941,771 (Haste, III) and U.S. Pat. No. 5,348,299 (Clapper, Jr.).

Figure 1:
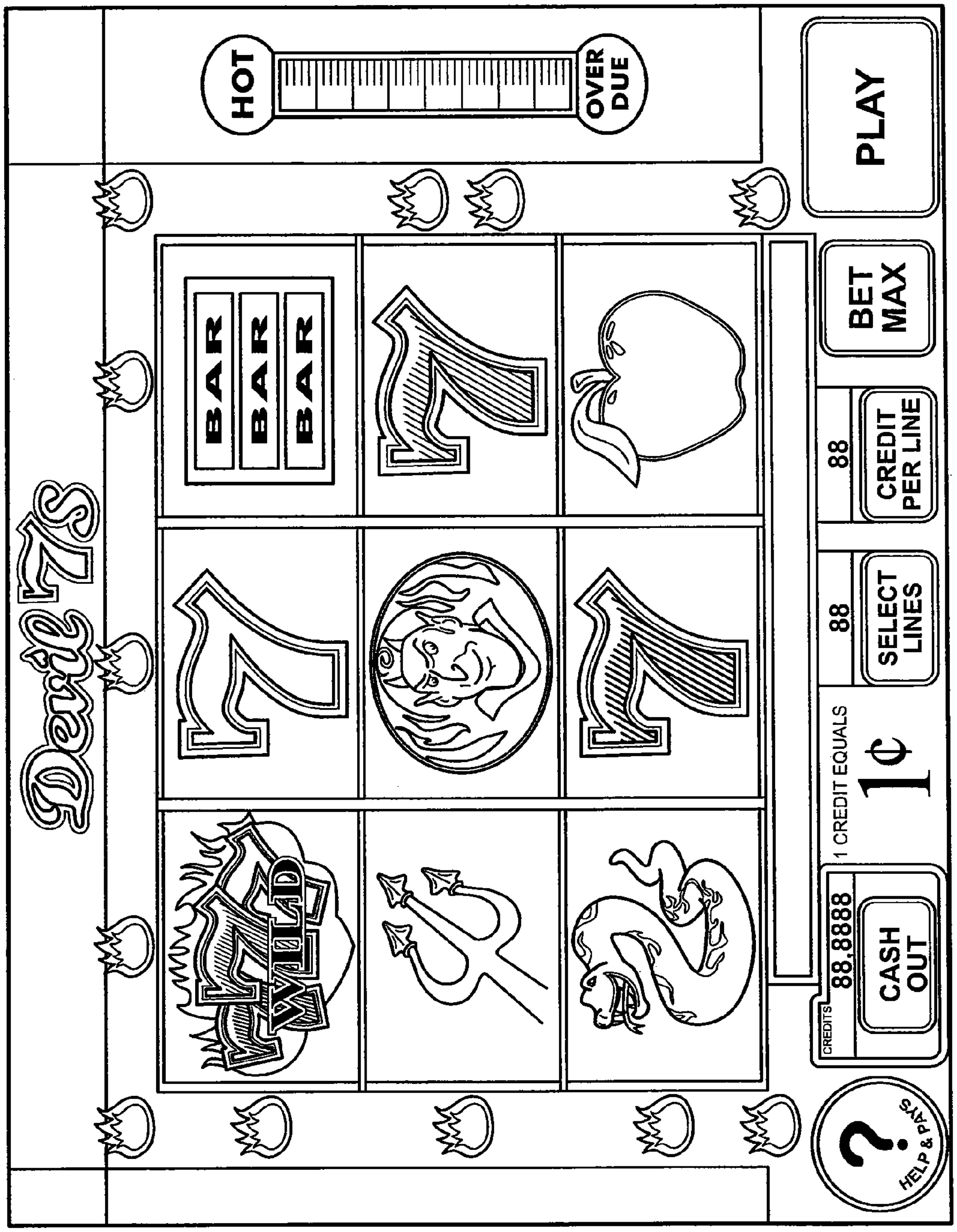
FIG. 1 shows a gaming machine display that includes a gauge in accordance with one preferred embodiment of the present invention.

FIG. 1 shows a sample display of a pull-tab machine called Devil 7s. In addition to the conventional display window (here, a three-reel display window), the right-hand side of the display includes a visual indicator on the gaming machine (here, incorporated into the existing graphical display) that shows the degree in which the gaming machine is currently playing hot. In one preferred embodiment, the visual indicator is a thermometer-type gauge that shows the degree of hotness as either discrete ranges of hotness, such as five discrete ranges, or as a continuous range of hotness. If desired, the ranges may be marked on the display, such as HOT (full thermometer), WARM, MEDIUM, COOL and FRIGID (empty thermometer).

Figure 2:
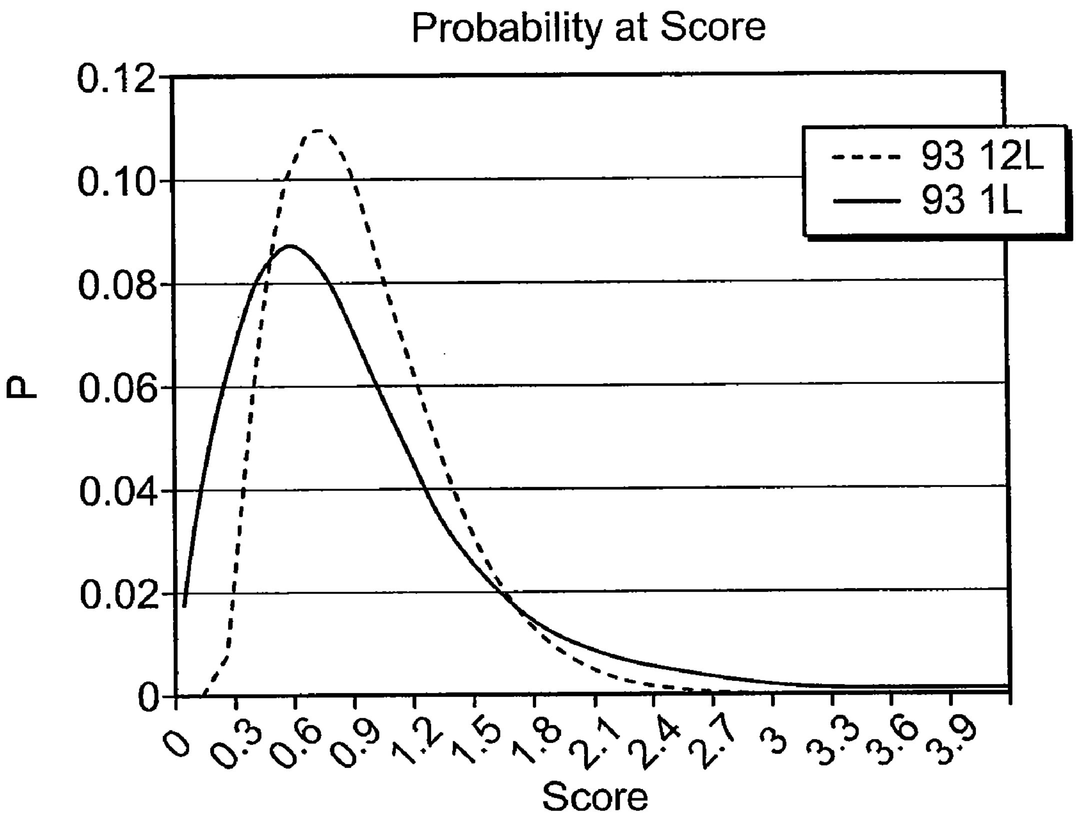
FIG. 2 shows a sample probability curve and related table that indicates the probability that the gauge will show different degrees of hotness in accordance with preferred embodiments of the present invention.

FIG. 2 shows a sample probability curve and related table that indicates the probability that the gauge will show different degrees of hotness. More specifically, the table in FIG. 2 shows the percent of time that the thermometer will be at a particular degree of hotness value and the boundaries between the different degrees of hotness represented as a minimum score needed to meet the particular degree of hotness. Two different probability curves are shown, one for a 1 line (1L) machine and one for a 12 line (12L) machine. Volatility is greater with the 1L machine.

FIG. 3 shows the data values for the 1L and 12L probability curves of FIG. 2.

In one preferred implementation, each game is scored as the value of "credits out divided by credits wagered." This process helps to normalize play at different lines/bets. Also, in one preferred implementation, the thermometer score is the average value of the last 100 games and the thermometer displays the current score value. (The "score" refers to the "score" shown in FIG. 2.) In one preferred embodiment, the game scores are stored in a circular buffer having a length of 100 plays. All winning and losing game plays are tracked. If a jackpot exists, then the jackpot win may also be included. In an alternative embodiment that includes a jackpot, the jackpot win may be excluded from the tracking so as to avoid having a large, one-time event affect the thermometer score.

The scope of the invention includes other algorithms for determining the degree of hotness of game play such as those discussed in U.S. Published Patent Application No. 2008/0026822.

The visual indicator may be a visual display on the gaming machine such as shown in FIG. 1, or may be a hardware display physically mounted to the gaming machine. Furthermore, the visual indicator may take forms other than a thermometer, such as a gauge (e.g., line gauge, dial gauge), a raw number on a scale (e.g., 1-100), or the like.

The gaming machine is described herein as a pull tab machine, but the scope of the present invention includes other types of gaming machines, such as slot machines.

As discussed above, the visual indicator may display the degree of hotness of the current gaming machine or a bank of predefined gaming machines. Preferably, the bank of machines is identified to the game players so that they can decide which bank of machines they wish to display. The visual indicator may be proximate to the bank of gaming machines, such as in an overhead display that is associated with the bank of machines, or the visual indicator may be physically mounted to each of the gaming machines in the bank. In the latter embodiment, the visual indicator in each gaming machine in the bank would have an identical value.

Figure 4:
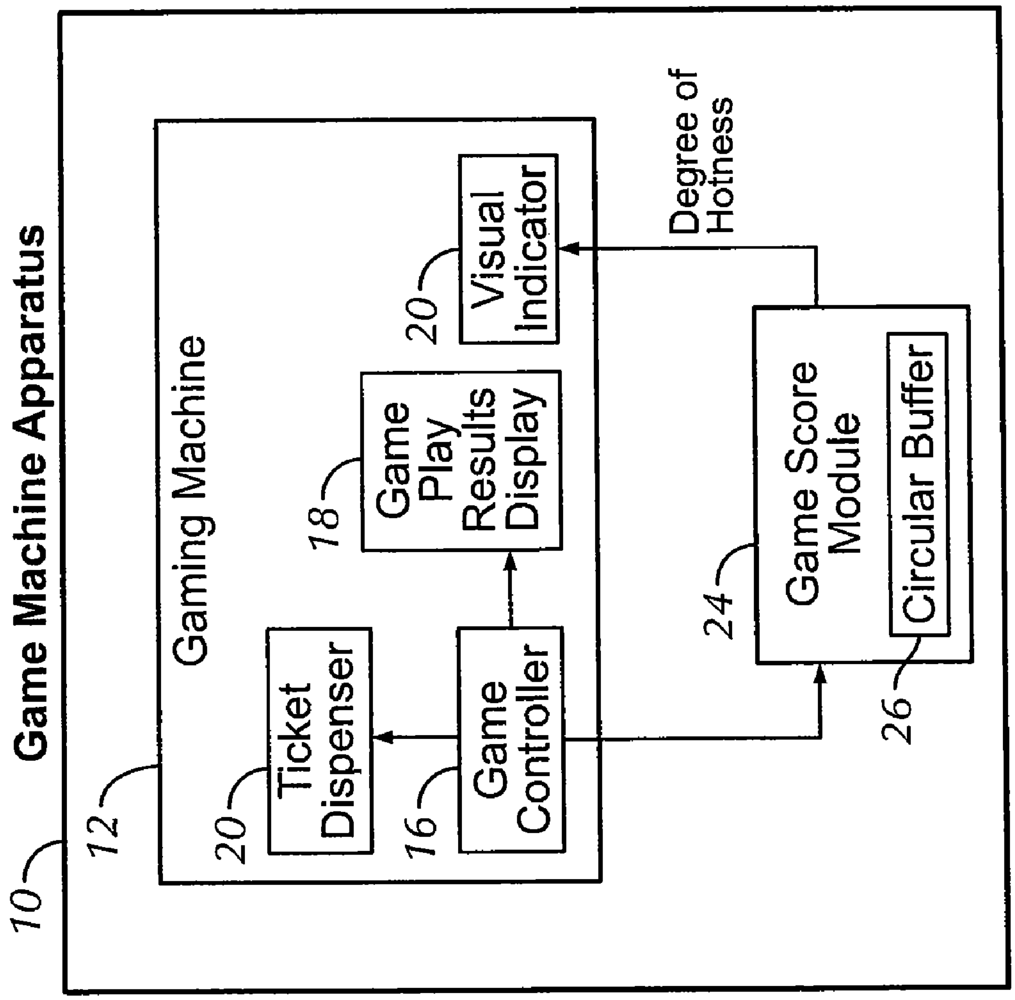
FIGS. 4-6 show schematic diagrams of gaming machine apparatus in accordance with preferred embodiments of the present invention.
Figure 5:
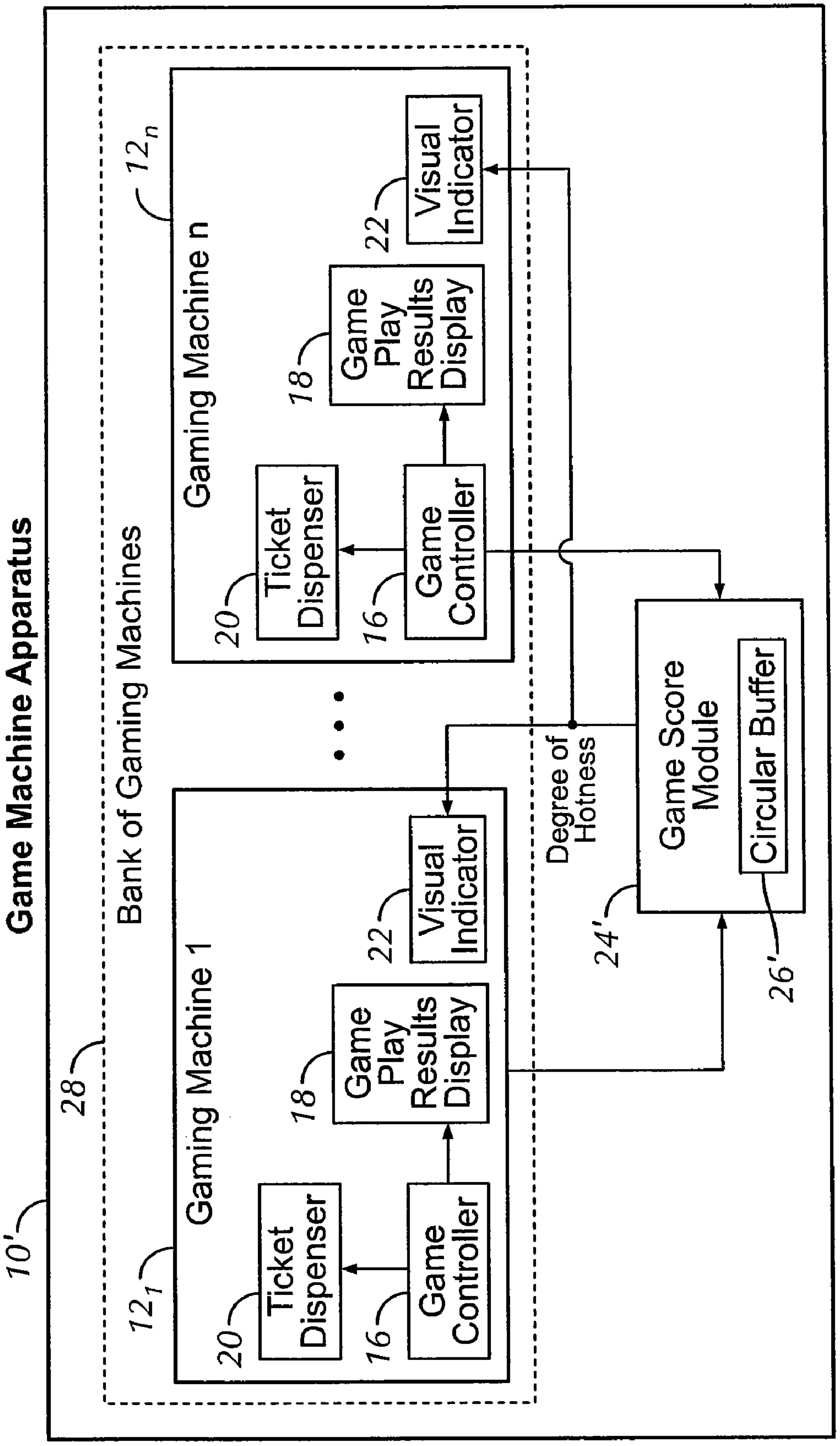
Figure 6:
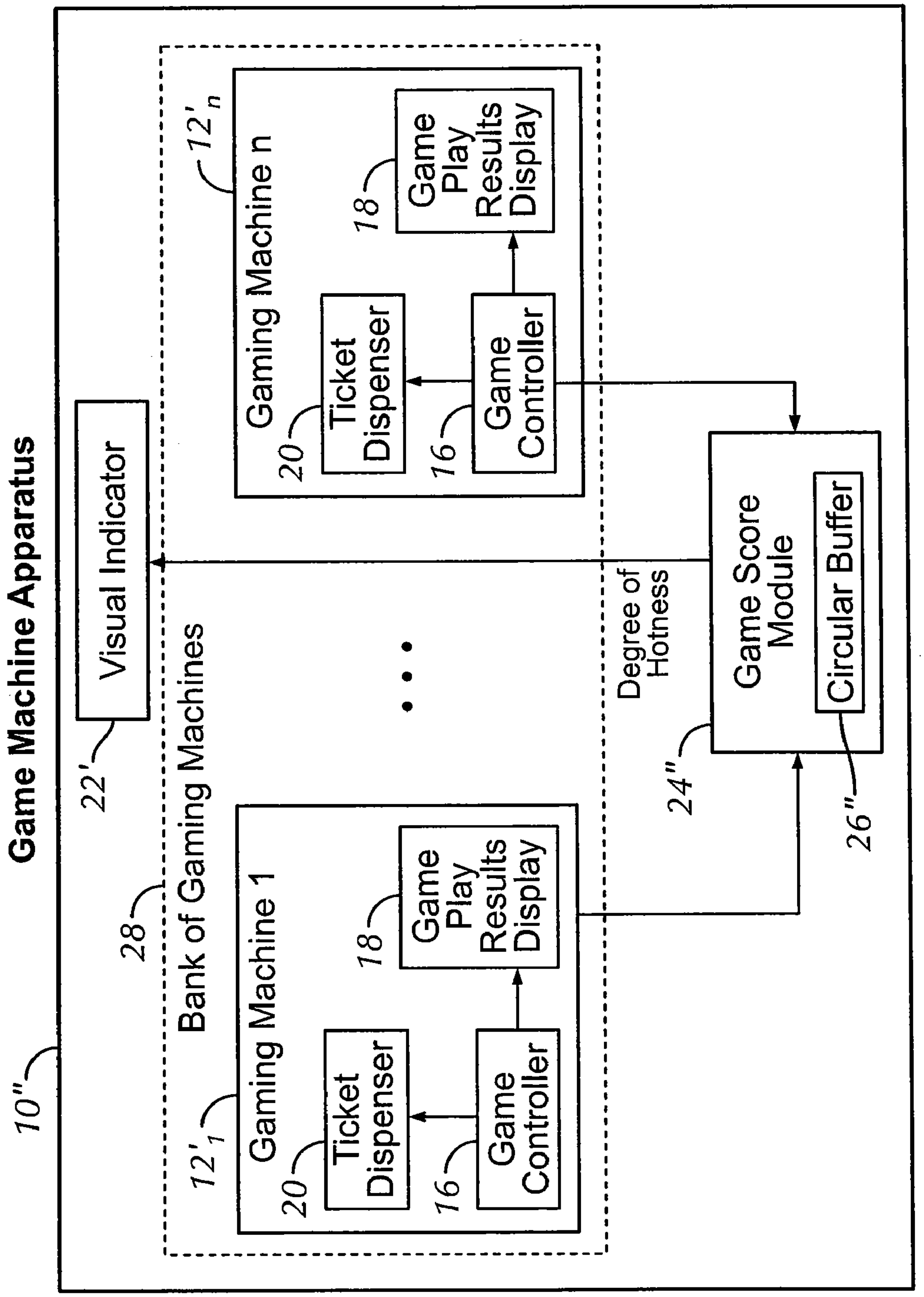

FIGS. 4-6 show schematic block diagrams of apparatus in accordance with preferred embodiments of the present invention. FIG. 4 shows a gaming machine apparatus 10 having a gaming machine 12 and game score module 14. The gaming machine 12 includes a conventional game controller 16, conventional game play results display 18 and optional conventional ticket dispenser 20. The gaming machine 12 further includes a visual indicator 22 as discussed above for displaying the degree of hotness of the gaming machine 12. The gaming machine apparatus further includes a game score module 24 that receives game score data from the game controller 16 and calculates the degree of hotness based on its stored algorithm. As discussed above, the game score module 24 may include a circular buffer 26 for maintaining the latest score used for calculating the degree of hotness. In an alternative embodiment, the game score module 24 may be part of the gaming machine 12 itself.

FIGS. 5 and 6 shows preferred embodiments of the above-described bank of gaming machines 28. In these embodiments, each of the gaming machines 12 send their respective results to a single game score module 24' that calculates the degree of hotness of the entire bank of gaming machines 28, and sends the results to either individual visual indicators 22 on each of the gaming machines 12 (FIG. 5) or to a common visual indicator 22' proximate to the gaming machines 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A gaming machine that provides for random winning payouts for game plays, wherein each game play has a payout value, the gaming machine comprising:

(a) a game score module that tracks a predetermined number of previous game play results including all winning and losing game play results of the predetermined number of previous game play results, and determines from the payout values of the predetermined number of previous game play results the degree in which the gaming machine is currently playing hot; and (b) a visual indicator on the gaming machine or physically mounted to the gaming machine that indicates the degree in which the gaming machine is currently playing hot.

2. The gaming machine of claim 1 wherein the game score module determines the degree in which the gaming machine is currently playing hot by comparing an average of the payout value of the predetermined number of previous game plays to a plurality of ranges of benchmark values, the highest range of benchmark values indicating a hot gaming machine.

3. The gaming machine of claim 1 wherein the predetermined number of previous game plays is about 100 plays.

4. The gaming machine of claim 1 wherein the statistical likelihood of a winning payout for a current play is not dependent upon results of previous plays.

5. The gaming machine of claim 1 wherein the visual indicator is a thermometer-type gauge.

6. The gaming machine of claim 1 wherein the gaming machine is a pull tab machine and the game play result is determined by the contents of a pull tab ticket.

7. The gaming machine of claim 1 wherein the winning payouts include jackpot winnings, the game score module thereby including the jackpot winnings in determining from the payout values of the predetermined number of previous game play results the degree in which the gaming machine is currently playing hot.

8. The gaming machine of claim 1 wherein the winning payouts exclude jackpot winnings, the game score module thereby excluding the jackpot winnings in determining from the payout values of the predetermined number of previous game play results the degree in which the gaming machine is currently playing hot.

9. The gaming machine of claim 2 wherein the visual indicator is a thermometer-type gauge and a hot gaming machine shows a full thermometer.

10. The gaming machine of claim 2 wherein the payout value is the value of game credits won divided by game credits wagered.

11. The gaming machine of claim 2 wherein the predetermined number of previous game plays are consecutive game plays immediately preceding the current game play, the game score module further comprising a circular buffer for storing the predetermined number of previous game plays.

12. The gaming machine of claim 2 wherein the payout value ranges from zero to a predetermined maximum value.

13. A gaming machine apparatus comprising:

(a) a gaming machine that provides for random winning payouts for game plays, wherein each game play has a payout value;

(b) a game score module that tracks a predetermined number of previous game play results including all winning and losing game play results of the predetermined number of previous game play results, and determines from the payout values of the predetermined number of previous game play results the degree in which the gaming machine is currently playing hot; and (c) a visual indicator on the gaming machine or physically mounted to the gaming machine that indicates the degree in which the gaming machine is currently playing hot.

14. The gaming machine apparatus of claim 13 wherein the game score module determines the degree in which the gaming machine is currently playing hot by comparing an average of the payout value of the predetermined number of previous game plays to a plurality of ranges of benchmark values, the highest range of benchmark values indicating a hot gaming machine.

15. The gaming machine apparatus of claim 13 wherein the predetermined number of previous game plays is about 100 plays.

16. The gaming machine apparatus of claim 13 wherein the statistical likelihood of a winning payout for a current play is not dependent upon results of previous plays.

17. The gaming machine apparatus of claim 13 wherein the visual indicator is a thermometer-type gauge.

18. The gaming machine apparatus of claim 13 wherein the gaming machine is a pull tab machine and the game play result is determined by the contents of a pull tab ticket.

19. The gaming machine of claim 13 wherein the winning payouts include jackpot winnings, the game score module thereby including the jackpot winnings in determining from the payout values of the predetermined number of previous game play results the degree in which the gaming machine is currently playing hot.

20. The gaming machine of claim 13 wherein the winning payouts exclude jackpot winnings, the game score module thereby excluding the jackpot winnings in determining from the predetermined number of previous game play results the degree in which the gaming machine is currently playing hot.

21. The gaming machine apparatus of claim 14 wherein the visual indicator is a thermometer-type gauge and a hot gaming machine shows a full thermometer.

22. The gaming machine apparatus of claim 14 wherein the payout value is the value of game credits won divided by game credits wagered.

23. The gaming machine apparatus of claim 14 wherein the predetermined number of previous game plays are consecutive game plays immediately preceding the current game play, the game score module further comprising a circular buffer for storing the predetermined number of previous game plays.

24. The gaming machine apparatus of claim 14 wherein the payout value ranges from zero to a predetermined maximum value.

25. A gaming machine apparatus comprising:

(a) a bank of gaming machines, each gaming machine in the banks providing for random winning payouts for game plays, wherein each game play has a payout value;

(b) a game score module that tracks a predetermined number of previous game play results for the bank of gaming machines including all winning and losing game play results of the predetermined number of previous game play results for the bank of gaming machines, and determines from the payout values of the predetermined number of previous game play results the degree in which the bank of gaming machines is currently playing hot; and (c) a visual indicator proximate to the gaming machines that indicates the degree in which the bank of gaming machines is currently playing hot.

26. The gaming machine apparatus of claim 25 wherein the game score module determines the degree in which the bank of gaming machines is currently playing hot by comparing an average of the payout value of the predetermined number of previous game plays to a plurality of ranges of benchmark values, the highest range of benchmark values indicating a hot bank of gaming machines.

27. The gaming machine apparatus of claim 25 wherein the predetermined number of previous game plays is about 100 plays.

28. The gaming machine apparatus of claim 25 wherein the statistical likelihood of a winning payout for a current play is not dependent upon results of previous plays.

29. The gaming machine apparatus of claim 25 wherein the visual indicator is a plurality of visual indicators, each visual indicator being on each of the gaming machines or physically mounted to each of the gaming machines and showing the same degree in which the bank of gaming machines is currently playing hot.

30. The gaming machine apparatus of claim 25 wherein the visual indicator is a thermometer-type gauge.

31. The gaming machine apparatus of claim 25 wherein the gaming machine is a pull tab machine and the game play result is determined by the contents of a pull tab ticket.

32. The gaming machine of claim 25 wherein the winning payouts include jackpot winnings, the game score module thereby including the jackpot winnings in determining from the payout values of the predetermined number of previous game play results the degree in which the bank of gaming machines is currently playing hot.

33. The gaming machine of claim 25 wherein the winning payouts exclude jackpot winnings, the game score module thereby excluding the jackpot winnings in determining from the payout values of the predetermined number of previous game play results the degree in which the bank of gaming machines is currently playing hot.

34. The gaming machine apparatus of claim 26 wherein the visual indicator is a thermometer-type gauge and a hot bank of gaming machines shows a full thermometer.

35. The gaming machine apparatus of claim 26 wherein the payout value is the value of game credits won divided by game credits wagered.

36. The gaming machine apparatus of claim 26 wherein the predetermined number of previous game plays are consecutive game plays immediately preceding the current game play, the game score module further comprising a circular buffer for storing the predetermined number of previous game plays.

37. The gaming machine apparatus of claim 26 wherein the payout value ranges from zero to a predetermined maximum value.

* * * * *